(12) United States Patent
Langhammer et al.

(10) Patent No.: US 9,348,557 B1
(45) Date of Patent: May 24, 2016

(54) FUSED FLOATING POINT DATAPATH WITH CORRECT ROUNDING

(71) Applicant: Altera Corporation, San Jose, CA (US)

(72) Inventors: Martin Langhammer, Salisbury (GB); Bogdan Pasca, Chesham (GB)

(73) Assignee: ALTERA CORPORATION, San Jose, CA (US)

( * ) Notice: Subject to any disclaimer, the term of this patent is extended or adjusted under 35 U.S.C. 154(b) by 225 days.

(21) Appl. No.: 14/187,075

(22) Filed: Feb. 21, 2014

(51) Int. Cl.
*G06F 7/00* (2006.01)
*G06F 7/483* (2006.01)

(52) U.S. Cl.
CPC .................................... *G06F 7/483* (2013.01)

(58) Field of Classification Search
CPC ...................................................... G06F 7/483
USPC ................................. 708/201, 496–497, 499
See application file for complete search history.

(56) References Cited

U.S. PATENT DOCUMENTS

| | | | |
|---|---|---|---|
| 5,122,981 A * | 6/1992 | Taniguchi ............... | G06F 7/483 708/497 |
| 5,128,889 A * | 7/1992 | Nakano ................... | G06F 7/485 708/497 |
| 7,865,541 B1 | 1/2011 | Langhammer | |

* cited by examiner

*Primary Examiner* — Tan V. Mai (57) ABSTRACT

In accordance with some embodiments, a floating point number datapath circuitry, e.g., within an integrated circuit programmable logic device is provided. The datapath circuitry may be used for computing a rounded absolute value of a mantissa of a floating point number. The floating point datapath circuitry may have only a single adder stage for computing a rounded absolute value of a mantissa of the floating point number based on one or more bits of an unrounded mantissa of the floating point number. The unrounded and rounded mantissas may include a sign bit, a sticky bit, a round bit, and/or a least significant bit, and/or other bits. The unrounded mantissa may be in a format that includes negative numbers (e.g., 2's complement) and the rounded mantissa may be in a format that may include a portion of the floating point number represented as a positive number, (e.g., signed magnitude).

20 Claims, 5 Drawing Sheets

FUSED FLOATING POINT DATAPATH WITH CORRECT ROUNDING

FIELD OF THE INVENTION

This invention relates to a performing floating point operations in programmable integrated circuit devices, including the use of specialized processing blocks, which may be included in such devices, to perform floating point operations.

BACKGROUND

Considering a programmable logic device (PLD) as one example of an integrated circuit device, as applications for which PLDs are used increase in complexity, it has become more common to design PLDs to include configurable specialized processing blocks in addition to blocks of generic programmable logic resources. Such configurable specialized processing blocks may include a concentration of circuitry on a PLD that has been partly or fully hardwired to perform one or more specific tasks, such as a logical or a mathematical operation. A configurable specialized processing block may also contain one or more specialized structures, such as an array of configurable memory elements. Examples of structures that are commonly implemented in such configurable specialized processing blocks include: adders/subtractors, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of configurable specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® and ARRIA® families include DSP blocks, each of which includes a plurality of multipliers, adders/subtractors, and registers, as well as programmable connectors (e.g., multiplexers) that allow the various components of the block to be configured in different ways.

Floating Point Compiler (FPC) technology has been developed to map floating point datapaths to generic PLD (and other integrated circuit) architectures, which may include DSP blocks, as described above. Aspects of such FPC technology may be found described in commonly-assigned U.S. patent application Ser. No. 11/625,655 (now U.S. Pat. No. 7,865,541), filed Jan. 22, 2007, which is hereby incorporated by reference herein in its entirety. FPC may achieve efficiency gains by fusing together large subsections of a datapath, for example, by clustering similar operations together, and by optimizing the interface between clusters of dissimilar operators. Using Floating Point Compiler (FPC) technology to perform calculations may be important to Altera's DSP offering. Such FPC technology may be used for calculating the sum or product of two double precision numbers. For example, the MATH.H library used in the C/C++ programming languages requires compliant systems to support of double precision multiplication.

The IEEE754 1985 standard is commonly used for floating point numbers. A floating point number includes three different parts: the sign of the number, its mantissa and its exponent. The mantissa may be of different sizes, depending on the desired precision of the floating point number. For example, the mantissa may be 23 bits long for single precision floating point numbers, with an implied leading 1. For example, the mantissa may be 52 bits long for double precision floating point numbers, with an implied leading 1. In comparison with calculations in accordance with the IEEE754 1985 standard, FPC technology may produce higher quality results. In particular, 75% of FPC based calculations may be more accurate than the equivalent calculations performed using the IEEE754 1985 standard. This may be because FPC based calculations may support larger average mantissas and may provide local underflow and overflow support. FPC based calculations may make use of mantissas of a similar size to the IEEE754-1985 standard, but may not round to the same sizes of mantissas as specified in the IEEE754 1985 standard. For example, even if the FPC based calculations are to be the analog of calculations of the IEEE754 1985 standard in terms of precision, single precision FPC based calculations may make use of larger mantissas, e.g., 32 bit mantissas. As another example, single precision FPC based calculations may make use of mantissas of variable sizes, e.g., 24 bits or larger mantissas. However, 25% of FPC based calculations may be less accurate than the equivalent calculations performed using the IEEE754 1985 standard. This may be because of a lack of rounding of numbers, which may be due to the difficulty of inserting/supporting sticky bits in current FPC signed number formats. Specifically, rounding numbers based on the FPC technology may be expensive in terms of the need to include additional mantissa adder structure, which could lead to increased clock latency and an increase in floating point adder area, e.g., by 15%. In addition, rounding numbers based on FPC technology may be expensive due to an absolute value (ABS) calculation performed, after addition using the added mantissa adder structure, and the possible further increased clock latency that results from this ABS calculation. In addition, the use of unsigned numbers in an FPC may be costly in terms of efficiency for the FPC, which primarily makes use of signed non-normalized numbers.

SUMMARY OF THE INVENTION

In accordance with embodiments of the present invention, configurable specialized processing blocks such as the DSP blocks described above may be enhanced by including floating point datapath circuitry to compute the rounded absolute value (ABS) of a signed magnitude formatted (such as those used in FPC calculations) number using solely a single stage of adders that support calculations with sticky bits. Although the current structure for such floating point datapath circuitry may include two stages of adders to compute the ABS of a number and to round that number (e.g., for use in converting signed magnitude numbers to signed numbers with current FPC algorithms), it may be advantageous to include only one adder stage for the same functionality. In accordance with embodiments of the present disclosure, there is provided a single adder stage structure for such floating point datapath circuitry (possibly used within a DSP block) that allows for a combined ABS function and rounding function to be performed on a floating point number. The resulting single adder stage structure has a zero net adder change to the overall structure of the floating point datapath circuitry. Such a single adder stage structure may allow for increased efficiency and decreased area consumed in any circuitry that currently is used to perform such ABS and rounding functions. In addition, such an adder structure may produce higher quality results and significant accuracy improvements than previous adder structures used in calculations, e.g., FPC calculations.

Moreover, such adder structure may be used to improve accuracy and quality in floating point calculations performed using the ADSPB standard, the OpenCL standard (e.g., OpenCL 13.1), and in any floating point megafunctions.

Therefore, in accordance with embodiments of the present invention there is provided methods and systems that include a floating point datapath circuitry, e.g., within an integrated circuit programmable logic device. The floating point datapath circuitry may have only a single adder stage for computing a rounded absolute value of a mantissa of the floating point number based on at least two bits of an unrounded mantissa of the floating point number. The floating point datapath circuitry may include look up table (LUT) circuitries that receive the at least two bits of the unrounded mantissa of the floating point number and that are used to determine intermediate bits used to compute the rounded absolute value of the mantissa of the floating point number. The unrounded mantissa and the rounded absolute value of the mantissa may include a sign bit, a sticky bit, a round bit, and/or a least significant bit, and/or other bits.

In accordance with embodiments of the present invention there is provided methods and systems that include a floating point datapath circuitry that, e.g., may be implemented within an integrated circuit programmable logic device. The floating point datapath circuitry may have only a single adder stage for computing a rounded absolute value of a mantissa of the floating point number based on at least a sign bit of an unrounded mantissa of the floating point number. The floating point datapath circuitry may include look up table (LUT) circuitries that receive the at least the sign bit of the unrounded mantissa of the floating point number and that are used to determine intermediate bits used to compute the rounded absolute value of the mantissa of the floating point number. The unrounded mantissa and the rounded absolute value of the mantissa may include a sign bit, a sticky bit, a round bit, and/or a least significant bit, and/or other bits.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

Figure 1:
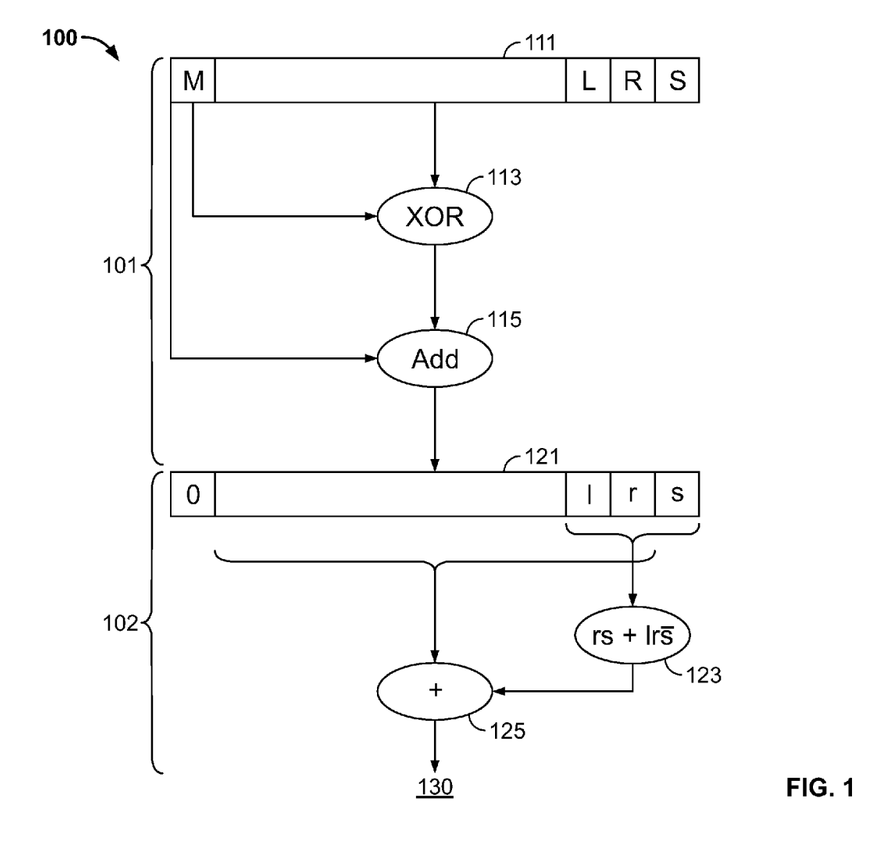
FIG. 1 shows an exemplary arrangement in which the ABS and rounding functions are performed on a floating point number in a datapath using a two adder structure according to an embodiment of the present invention.

FIG. 1 shows a logical representation of exemplary datapath circuitry 100 in which the ABS and rounding functions are performed on a floating point number in a datapath using a two adder structure according to an embodiment of the present invention. In this logical representation, details of implementation, such as registers and some programmable routing features—such as multiplexers that may allow the output of a particular element to be routed directly out of circuitry 100—are omitted to simplify discussion. In addition, some elements that are shown may, in an actual embodiment, be implemented more than once. For example, XOR logic 113 may actually represent two or more XOR gates.

In the logical representation of FIG. 1, datapath circuitry 100 may be implemented using FPC technology and located within any configurable specialized processing block. The floating-point ABS function circuitry 101 and rounding function circuitry 102, that are included as a part of circuitry 100, may follow a floating-point adder/subtractor. ABS function circuitry 101 may be used to calculate the absolute value (ABS) of the mantissa of a floating point number and rounding function circuitry 102 may be used to round the result of this calculation.

Specifically, value 111 may be the mantissa bits of a floating point number. These mantissa bits may include a sign bit (M), a least-significant bit (L), as well as round (R) and "sticky" (S) bits beyond the least significant bit, prior to rounding. XOR logic 113 of ABS function circuitry 101 may be used to XOR each of the bits of the mantissa, value 111, with the sign bit (M). This may result in the 1's complement representation, $frac_{C1}$, of the mantissa, value 111. Then, adder 115 of ABS function circuitry 101 may be used to add this result, $frac_{C1}$, with the sign bit (M) to produce the 2's complement representation, $frac_{C2}$. The bits of this result from adder 115 may be value 121. Value 121 may contain bits of the result of adder 115. These bits may also include a least-significant bit (l), as well as round (r) and "sticky" (s) bits beyond the least significant bit. Round bit logic 123 of rounding function circuitry 102 may be used to compute the result $rndBit = r^*s + l^*r^*\bar{s}$, where $\bar{s}$ the logical complement of s. The computation of rndBit in this way may be used for a round to the nearest scheme, however, other ways of calculating rndbit may be used for other rounding schemes. The results of round bit logic 123 may be input to adder 125 to be added to the bit position of bit r of the result, value 121. Adder 125 may be used to calculate the least significant bit and the other bits of the rounded version, 130, of value 121. By way of example, adder 125 may be implemented entirely or in part using look-up table circuitry. The rounding may be to the nearest number, with ties resulting in the nearest even number. Values 111 and 121, described above, may be stored in one or more registers individually or together.

Figure 2:
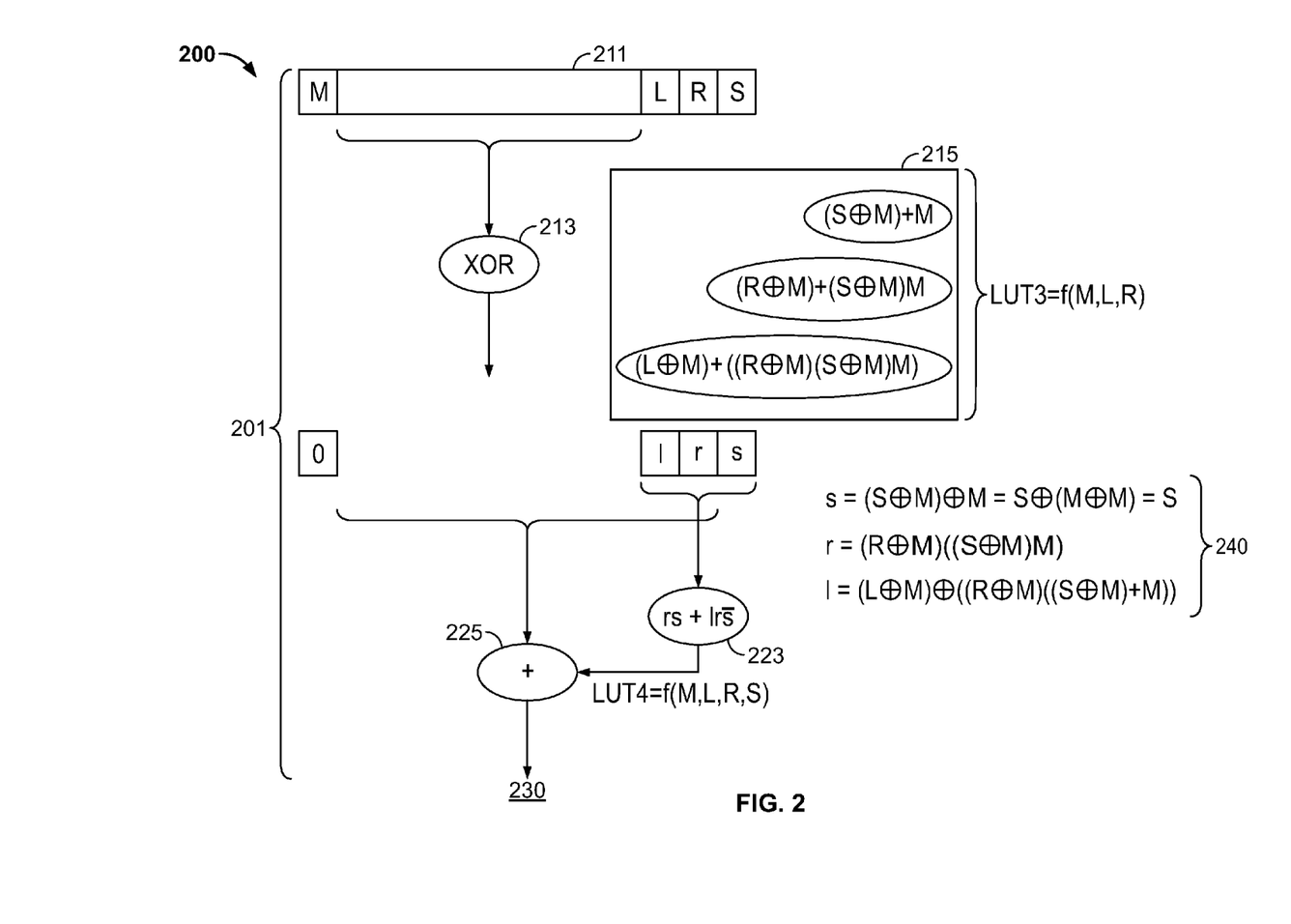
FIG. 2 shows an exemplary arrangement of an embodiment of the invention in which ABS and rounding functions are performed on a floating point number in a datapath using a single adder structure.

FIG. 2 shows a logical representation of exemplary datapath circuitry 200 in which the ABS and rounding functions are performed on a floating point number using a single adder structure according to an embodiment of the present invention. In this logical representation, details of implementation, such as registers and some programmable routing features—such as multiplexers that may allow the output of a particular element to be routed directly out of circuitry 200—are omitted to simplify discussion. In addition, some elements that are shown may, in an actual embodiment, be implemented more than once. For example, XOR logic 213 may actually represent two or more XOR gates.

In the logical representation of FIG. 2, datapath circuitry 200 may be implemented using FPC technology and located within any configurable specialized processing block. The combined floating-point ABS function and rounding function circuitry 201 (i.e., combined circuitry 201), that are included as a part of circuitry 200, may follow a floating-point adder/ subtractor. Combined circuitry 201 may be used to calculate the absolute value (ABS) and to round the mantissa of a floating point number.

Specifically, value 211 may contain the mantissa bits of a floating point number. These mantissa bits may include a sign bit (M), a least-significant bit (L), as well as round (R) and "sticky" (S) bits beyond the least significant bit, prior to rounding. XOR logic 213 of combined circuitry 201 may be used to XOR each of the bits of the mantissa, value 211, with the sign bit (M). This may result in the 1's complement representation, $frac_{C1}$, of the mantissa, value 211. Thus, $frac_{C1}$ may be expressed as $((M \oplus M) \ldots (M \oplus S),(M \oplus R),(M \oplus S))$ which may equally be represented as $(0, \ldots, l',R',S')$. Then, these results may be used together with the sign bit (M), in value 211, to directly compute intermediate bits including a least-significant bit (l), as well as round (r) and "sticky" (s) bits beyond the least significant bit. In particular, $s=(S \oplus M) \oplus M = S \oplus (M \oplus M) = S$, $r=(R \oplus M)((S \oplus M)M)$, and $l=(L \oplus M) \oplus \{(R \oplus M)(S \oplus M)+M\}$, may each be determined using, for example, a lookup table (LUT) that uses any combination of M, L, R, and S to determine any one of l, r, or s. The equations in the preceding sentence may be deduced based on performing the ripple carry addition of 2's complement, described above (for adder 115 of circuitry 100), using a half adder model with the sum equation $x \oplus y$ and the carry equation $x*y$, where $x*y$ is the logical AND of x and y. The results, s, l, and r may be output to round bit logic 223 of combined circuitry 201. Round bit logic 223 may be used to compute the result $rndBit=r*s+l*r*\bar{s}$, where $\bar{s}$ is the logical complement of s. The computation of rndBit in this way may be used for a round to the nearest scheme, however, other ways of calculating rndbit may be used for other rounding schemes. The results of round bit logic 223 may be input to adder 225 to be added to the bit position of bit r. This may result in the rounded version, 230, of value 211. By way of example, adder 225 may be implemented entirely or in part using look-up table circuitry. The rounding may be to the nearest number, with ties resulting in the nearest even number. In some embodiments, the rounding may be directed toward negative infinity. In some embodiments, the rounding may be directed toward positive infinity. In some embodiments, the rounding may be directed toward zero. In other embodiments, value 211 may be truncated to determine value 230. These rounding techniques may each require a different number of bits to compute, including the sign bit, a least-significant bit, a round bit, and/or a "sticky" bit. Value 211, described above, may be stored in one or more registers.

Figure 3:
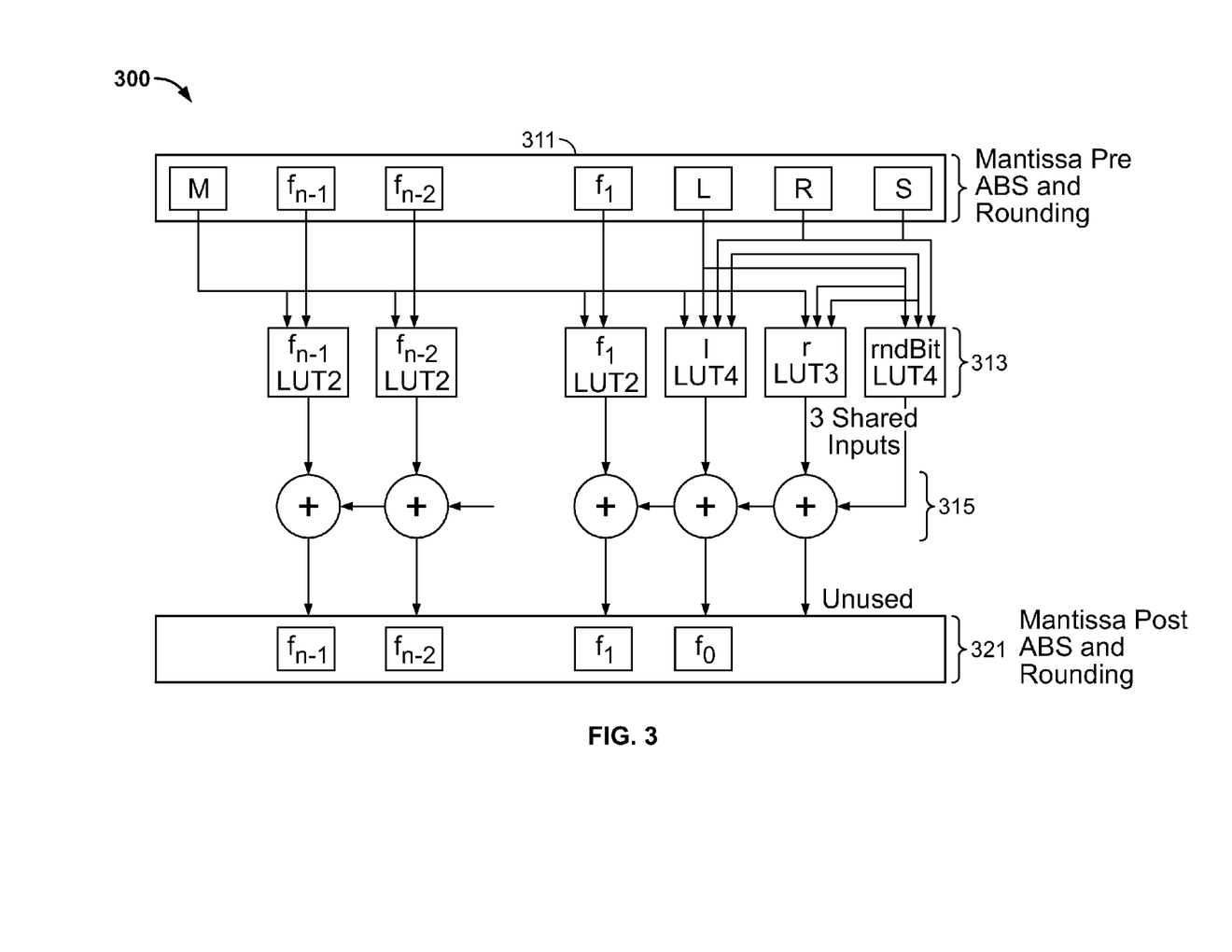
FIG. 3 shows a more detailed exemplary arrangement of an embodiment of the invention, as in FIG. 2, in which ABS and rounding functions are performed on a floating point number in a datapath using a single adder structure.

FIG. 3 shows a logical representation of exemplary datapath circuitry 300, which is similar in form and in function to datapath circuitry 200 of FIG. 2, in which the ABS and rounding functions are performed on a floating point number in a datapath using a single adder structure according to an embodiment of the present invention. In this logical representation, details of implementation, such as registers and some programmable routing features—such as multiplexers that may allow the output of a particular element to be routed directly out of circuitry 300—are omitted to simplify discussion. In addition, some elements that are shown may, in an actual embodiment, be implemented more than once.

In the logical representation of FIG. 3, circuitry 300 may be implemented using FPC technology and located within any configurable specialized processing block. The circuitry 300 may follow a floating-point adder/subtractor. Circuitry 300 may be used to calculate the absolute value (ABS) and to round the mantissa of a floating point number.

Specifically, value 311 may contain the mantissa bits of a floating point number. These mantissa bits may include a sign bit (M), a least-significant bit (L), as well as round (R) and "sticky" (S) bits beyond the least significant bit, prior to rounding. Look-up table circuitry 313 may be used to determine the result of XORing each of the bits of the mantissa, of value 311 (with the exception of the sign bit), with the sign bit (M), and also to directly determine intermediate bits including a least-significant bit (l), as well as round (r) and "sticky" (s) bits. In particular, $f_{n-1} \oplus M, f_{n-2} \oplus M, \ldots f_1 \oplus M$, may each be computed using a 2-input LUT, $l=(L \oplus M) \oplus \{(R \oplus M)((S \oplus M)+M)\}$ may be computed using a 4-input LUT with M, L, R, and S as inputs, $r=(R \oplus M)\{(S \oplus M)M\}$ may be computed using a 3-input LUT with M, R, and S as inputs, and $rndBit=r*s+l*r*\bar{s}$, $\bar{s}$ where is the logical complement of s (which equals S) may be computed using a 4-input LUT with M, L, R, and S as inputs. Each of these LUTs may be included in look-up table circuitry 313. The results of the look-up tables in look-up circuitry 313 may be input to single stage adders 315 (e.g., a single stage of adders performing ripple-carry addition with the sum equation $x \oplus y$ and the carry equation $x*y$, where $x*y$ is the logical AND of x and y) as shown in FIG. 3. The result of each of the adders 315 may be included in value 321. This result, value 321, may be the rounded version of the mantissa, value 311. The rounding may be to the nearest number, with ties resulting in the nearest even number. The computation of rndBit as described above may be used for a round to the nearest scheme, however, other ways of calculating rndbit (e.g., one of the ways described above with respect to FIG. 2) may be used for other rounding schemes.

TABLE 1

| M | A | B | C | L | R | S | l | r | s | Round | Rnd |
|---|---|---|---|---|---|---|---|---|---|-------|-----|
| 0 | 1 | 0 | 1 | 0 | 0 | 0 | 0 | 0 | 0 | 0 | X |
| 0 | 1 | 0 | 1 | 0 | 0 | 1 | 0 | 0 | 1 | 0 | X |
| 0 | 1 | 0 | 1 | 0 | 1 | 0 | 0 | 1 | 0 | 0 | 0 |
| 0 | 1 | 0 | 1 | 0 | 1 | 1 | 1 | 1 | 1 | 1 | 1 |
| 0 | 1 | 0 | 1 | 1 | 0 | 0 | 1 | 0 | 0 | 0 | X |
| 0 | 1 | 0 | 1 | 1 | 0 | 1 | 1 | 0 | 1 | 0 | X |
| 0 | 1 | 0 | 1 | 1 | 1 | 0 | 1 | 1 | 0 | 1 | 1 |
| 0 | 1 | 0 | 1 | 1 | 1 | 1 | 0 | 1 | 1 | 1 | 1 |
| 1 | 1 | 0 | 1 | 0 | 0 | 0 | 0 | 0 | 0 | 0 | X |
| 1 | 1 | 0 | 1 | 0 | 0 | 1 | 0 | 1 | 1 | 1 | 1 |
| 1 | 1 | 0 | 1 | 0 | 1 | 0 | 1 | 1 | 0 | 1 | 1 |
| 1 | 1 | 0 | 1 | 0 | 1 | 1 | 1 | 0 | 1 | 0 | X |
| 1 | 1 | 0 | 1 | 1 | 0 | 0 | 1 | 0 | 0 | 0 | X |
| 1 | 1 | 0 | 1 | 1 | 0 | 1 | 1 | 1 | 1 | 1 | 1 |
| 1 | 1 | 0 | 1 | 1 | 1 | 0 | 0 | 1 | 0 | 0 | 0 |
| 1 | 1 | 0 | 1 | 1 | 1 | 1 | 0 | 0 | 1 | 0 | X |

An example of the use of datapath circuitry described above, such as the use datapath circuitry 300 of FIG. 3, may be seen in Table 1. For example, Table 1 shows the input mantissa word bits, MABCLRS, where the bit values are identified in the column corresponding to the bits M, A, B, C, L, R, or S. These mantissa bits may include a sign bit (M), word bits A, B, and C, a least-significant bit (L), as well as round (R) and "sticky" (S) bits beyond the least significant bit, prior to rounding. Table 1 also shows, in separate columns, intermediate bits including a least-significant bit (l), as well as round (r) and "sticky" (s) bits, computed according to the formulas given above, e.g., using datapath circuitry described above, such as the Look-up table circuitry 313 of the datapath circuitry 300 of FIG. 3. Table 1 shows, in the second to the last column, the value of Round, which is computed as $rndBit=r*s+l*r*\bar{s}$, where $\bar{s}$ is the logical complement of s. Table 1 also shows, in the last column, the value of Rnd, which is the value that a round bit should be, where X stands for "don't care" (because neither 0 or 1 will change the value of the result). Because Table 1 shows that, for all values which are different than X, Round and Rnd are identical (which validates the mathematical computation of rndBit). Values 311 and 321, described above, may be stored in one or more registers individually or together.

Figure 4:
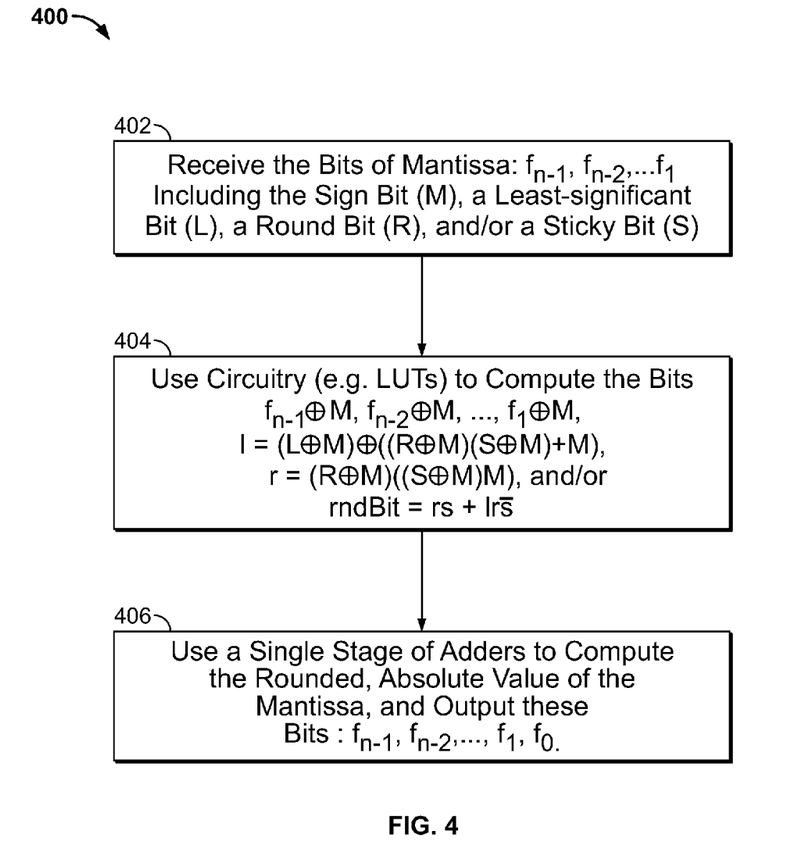
FIG. 4 shows an illustrative flow diagram of performing the ABS and rounding functions on a floating point number in a datapath using a single adder structure arrangement according to an embodiment of the present invention.

FIG. 4 shows illustrative flow diagram 400 of performing the ABS and rounding functions on a floating point number in a datapath using a single adder structure arrangement according to an embodiment of the present invention. Flow diagram 400 may be used to used to calculate the absolute value (ABS) and to round the mantissa of a floating point number using, e.g., circuitry 200 or 300, discussed above. Flow diagram 400 may include elements 402, 404, and 406.

At 402, the unrounded mantissa bits of a floating point number may be received from circuitry (such as values 211 or 311, or an adder/subtractor). These mantissa bits may include a sign bit (M), a least-significant bit (L), as well as round (R) and/or "sticky" (S) bits beyond the least significant bit, prior to rounding.

At 404, circuitry (such as Look-up table circuitry 313), or any other circuitry, may be used to determine the result of XORing each of the bits of the mantissa received at 402 (with the exception of the sign bit), with the sign bit (M), and also to directly determine intermediate bits including a least-significant bit (l), as well as round (r) and "sticky" (s) bits. In particular, $f_{n-1} \oplus M$, $f_{n-2} \oplus M$, ... $f_1 \oplus M$, may each be computed using, e.g, a 2-input LUT, $l=(L \oplus M) \oplus \{(R \oplus M)(S \oplus M)+M))\}$ may be computed using, e.g., a 4-input LUT with M, L, R, and S as inputs, $r=(R \oplus M)\{(S \oplus M)M\}$ may be computed using, e.g, a 3-input LUT with M, R, and S as inputs, and rndBit=$r*s+l*r*\bar{s}$, where $\bar{s}$ is the logical complement of s (which equals S) may be computed using, e.g, a 4-input LUT with M, L, R, and S as inputs. The results of 404 may be provided to 406. The computation of rndBit as described above may be used for a round to the nearest scheme, however, other ways of calculating rndbit may be used for other rounding schemes.

At 406, a single stage of adders (e.g., adders 315 performing ripple-carry addition with the sum equation $x \oplus y$ and the carry equation $x*y$, where $x*y$ is the logical AND of x and y, as shown in FIG. 3) may be used to compute the bits of the rounded, absolute value result of the unrounded mantissa received at 402. The result of each of the adders in the adder stage may be a bit, $f_{n-1}, f_{n-2} \ldots, f_1$, or $f_0$ (e.g., as shown in FIG. 3 as the result of adders 315) of the rounded, absolute value result of the mantissa received at 402. The rounding may be to the nearest number, with ties resulting in the nearest even number. This result may then be output in any suitable fashion. Using the techniques described herein, it should be noted that the result of the rounding that is output may have only 1 bit wordgrowth on the left side of the input mantissa, because the right side is constant due to rounding.

It should be understood that one or more elements (such as elements 402, 404, and 406) shown in flow diagram 400 may be combined with other elements, performed in any suitable order, performed in parallel (e.g., simultaneously or substantially simultaneously), or removed. For example, elements 404 and 406 of flow diagram 400 may be performed simultaneously, or in a different order than shown in FIG. 4. Processes 400 may be implemented using any suitable combination of hardware and/or software in any suitable fashion.

Figure 5:
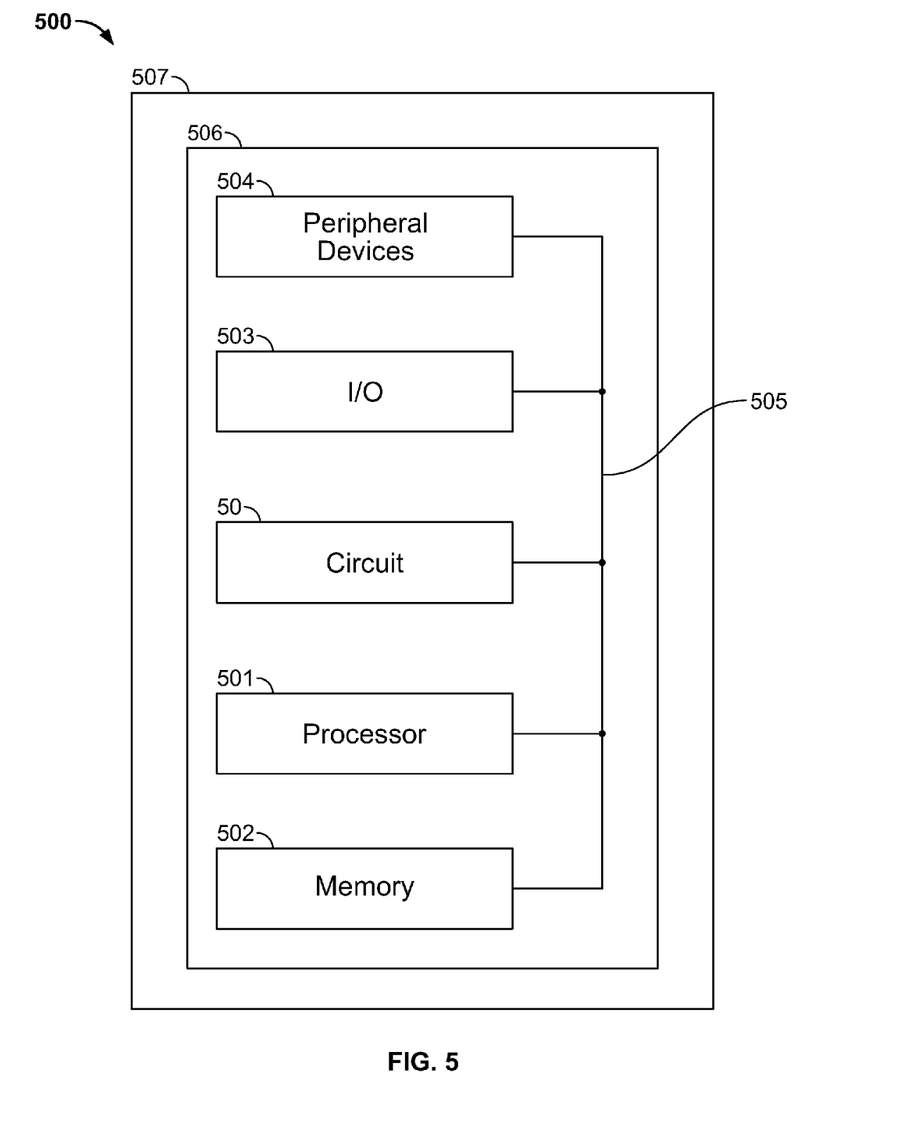
FIG. 5 is a simplified block diagram of an exemplary system employing circuitry incorporating the present invention.

FIG. 5 is a simplified block diagram of an exemplary system employing circuitry incorporating the present invention. Circuitry 50, which could, for example, be any Integrated Circuit Programmable Logic Device (PLD), incorporating configurable specialized processing blocks making use of the datapath structures (possibly implemented using FPC technology) according to the present invention may be used in many kinds of electronic devices. Circuitry 50 may be an integrated circuit, a processing block, application specific standard product (ASSP), application specific integrated circuit (ASIC), programmable logic device (PLD), full-custom chip, or a dedicated chip, however, for simplicity, it may be referred to as circuitry 50 herein. One possible use is in an exemplary data processing system 500 shown in FIG. 5. Data processing system 500 may include one or more of the following components: a processor 501; memory 502; I/O circuitry 503; and peripheral devices 504. These components are coupled together by a system bus 505 and are populated on a circuit board 506 which is contained in an end-user system 507.

System 500 can be used in a wide variety of applications, such as computer networking, data networking, instrumentation, video processing, digital signal processing, or any other application where the advantage of using programmable or reprogrammable logic is desirable. circuitry 50 can be used to perform a variety of different logic functions. For example, circuitry 50 can be configured as a processor or controller that works in cooperation with processor 501. Circuitry 50 may also be used as an arbiter for arbitrating access to a shared resource in system 500. In yet another example, circuitry 50 can be configured as an interface between processor 501 and one of the other components in system 500. It should be noted that system 500 is only exemplary, and that the true scope and spirit of the invention should be indicated by the following claims.

Various technologies can be used to implement circuitry 50 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Floating point datapath circuitry, said datapath circuitry comprising:
   solely a single adder stage for computing a rounded absolute value of a mantissa of a floating point number based on at least two bits of an unrounded mantissa of the floating point number.

2. The floating point datapath circuitry of claim 1 wherein the at least two bits includes a sign bit.

3. The floating point datapath circuitry of claim 1 wherein the at least two bits includes a sticky bit.

4. The floating point datapath circuitry of claim 1 wherein the at least two bits includes a round bit.

5. The floating point datapath circuitry of claim 1 wherein the floating point number is in a format that is capable of representing negative numbers.

6. The floating point datapath circuitry of claim 1 further comprising a plurality of look-up table (LUT) circuitries for receiving the at least two bits of an unrounded mantissa of the floating point number.

7. The floating point datapath circuitry of claim 1 wherein the rounded absolute value of the mantissa is part of a mantissa of a signed magnitude format of a floating point number.

8. A method of computing a rounded absolute value of an unrounded mantissa of a floating point number, said method comprising:

receiving at least two bits of the unrounded mantissa of the floating point number; and computing the rounded absolute value of a mantissa of the floating point number based on the at least two bits of the unrounded mantissa of the floating point number solely using a single adder.

9. The method of claim 8 wherein the at least two bits includes a sign bit.

10. The method of claim 8 wherein the at least two bits includes a sticky bit.

11. The method of claim 8 wherein the at least two bits includes a round bit.

12. The method of claim 8 wherein floating point number is in a format that is capable of representing negative numbers.

13. The method of claim 8 further comprising determining intermediate bits, using a plurality of look-up table circuitry, and based on the at least two bits, wherein the intermediate bits are used to compute the rounded absolute value of the mantissa of the floating point number.

14. The method of claim 8 wherein the rounded absolute value of the mantissa is part of a mantissa of a signed magnitude format of a floating point number.

15. Floating point datapath circuitry, said floating point datapath circuitry comprising:

solely a single adder stage for computing a rounded absolute value of a mantissa of a floating point number based on at least a sign bit of an unrounded mantissa of the floating point number.

16. The floating point datapath circuitry of claim 15 wherein the at least the sign bit includes the sign bit and a round bit.

17. The floating point datapath circuitry of claim 15 wherein the floating point number is in a format that is capable of representing negative numbers.

18. The floating point datapath circuitry of claim 15 further comprising a plurality of look-up table (LUT) circuitries for receiving the at least sign bit of an unrounded mantissa of the floating point number.

19. The floating point datapath circuitry of claim 15 wherein the rounded absolute value of the mantissa is part of a mantissa of a signed magnitude format of a floating point number.

20. The floating point datapath circuitry of claim 15 wherein a first adder in the single adder stage outputs its result to a second adder in the single adder stage to compute a least significant bit of the rounded absolute value of the mantissa based on the at least the sign bit.

* * * * *